United States Patent
Bedingfield, Sr.

(10) Patent No.: US 8,352,479 B2
(45) Date of Patent: Jan. 8, 2013

(54) SYSTEMS, METHODS AND COMPUTER PRODUCTS FOR CONTENT-DERIVED METADATA

(75) Inventor: James Carlton Bedingfield, Sr., Lilburn, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 550 days.

(21) Appl. No.: 11/953,316

(22) Filed: Dec. 10, 2007

(65) Prior Publication Data

US 2009/0150425 A1 Jun. 11, 2009

(51) Int. Cl.
*G06F 17/30* (2006.01)

(52) U.S. Cl. .......................... 707/755; 707/736; 707/758

(58) Field of Classification Search .................. 707/755, 707/758, 705, 736, 737, 913
See application file for complete search history.

(56) References Cited

U.S. PATENT DOCUMENTS

| | | | | |
|---|---|---|---|---|
| 6,163,782 | A * | 12/2000 | Singhal | 1/1 |
| 7,277,766 | B1 * | 10/2007 | Khan et al. | 700/94 |
| 7,356,830 | B1 * | 4/2008 | Dimitrova | 725/51 |
| 7,487,086 | B2 * | 2/2009 | Griggs | 704/235 |
| 2005/0038814 | A1 * | 2/2005 | Iyengar et al. | 707/104.1 |
| 2007/0124319 | A1 * | 5/2007 | Platt et al. | 707/101 |
| 2007/0168543 | A1 * | 7/2007 | Krikorian et al. | 709/231 |
| 2007/0239802 | A1 * | 10/2007 | Razdow et al. | 707/203 |
| 2007/0250529 | A1 * | 10/2007 | Beato et al. | 707/102 |
| 2007/0282871 | A1 * | 12/2007 | Ohwa et al. | 707/100 |
| 2008/0028218 | A1 * | 1/2008 | Simon | 713/170 |
| 2008/0140684 | A1 * | 6/2008 | O'Reilly et al. | 707/100 |
| 2008/0307463 | A1 * | 12/2008 | Beetcher et al. | 725/53 |

* cited by examiner

*Primary Examiner* — Tony Mahmoudi
*Assistant Examiner* — Md. I Uddin
(74) *Attorney, Agent, or Firm* — Cantor Colburn LLP

(57) ABSTRACT

Systems, methods and computer products for content-derived (generated) metadata. Exemplary embodiments include a metadata generation method, including receiving a media file, searching the media file for metadata associated with the media file, adding the metadata to a metadata file associated with the media file, searching the media file for media components and adding metadata entries that are associated with the media components to the metadata file.

13 Claims, 2 Drawing Sheets

SYSTEMS, METHODS AND COMPUTER PRODUCTS FOR CONTENT-DERIVED METADATA

The present invention relates generally to multimedia systems, and more particularly, to systems, methods and computer products for content-derived (generated) metadata.

The term "metadata" refers to data which describes characteristics of other data. For example, metadata associated with a computer word processing file might include the title of the document, the name of the author, the company to whom the document belongs, the dates that the document was created and last modified, keywords which describe the document, and other descriptive data. While some of this information may also be included in the document itself (e.g., title, author, and data), metadata is a separate collection of data which may be stored separately from, but associated with, the actual document. One common format for documenting metadata is eXtensible Markup Language (XML). XML provides a formal syntax which supports the creation of arbitrary descriptions, sometimes called "tags." An example of a metadata entry might be <title>War and Peace</title>, where the bracketed words delineate the beginning and end of the group of characters that constitute the title of the document which is described by the metadata.

In the example of the word processing file, the metadata (sometimes referred to as "document properties") is generally entered manually by the author, editor, or document manager. However, manual entry of metadata can be laborious, and is frequently skipped. However, metadata provides a critical capability used by search engines.

Internet photo management services exemplify one approach to the creation of metadata. Photo sharing sites usually propose several ways to classify images. For example, most sites propose at least a taxonomy where images can be grouped within a directory-like structure in so-called "galleries". Some sites also allow users to classify images using tags to build a folksonomy. Depending on the restrictions on the set of users allowed to tag a single document and the set of tags available to describe the document, one speaks about narrow and broad folksonomies. A folksonomy is broad when there is no restriction on the set of taggers and available tags. When there are limitations, the folksonomy is called narrow. Another mechanism is coupling taxonomy and folksonomy, where tags associated to galleries and artists are cascaded to the galleries and artist's pictures.

While this method produces interesting and generally useful results, it requires that the media to be described be published and widely distributed, usually on the Internet. In addition, the "folksonomy" approach to metadata creation can produce seemingly random, frivolous, amusing, or "niche interest" tags. (Note that the term "tag" used here is slightly different from the XML term previously described, but the terms are clearly related.)

Because of the benefits of metadata in searching, especially for non-text data such as sound or image, and because of the difficulty of manually entering metadata, and because of the limitations of folksonomy-based metadata, there is a need for an automated method to create metadata based on the content of the media file(s) of interest.

BRIEF SUMMARY

Exemplary embodiments include a metadata generation method, including receiving a media file, searching the media file for useful descriptive information associated with the media file, categorizing and/or organizing this information in the form of metadata, adding the metadata to a metadata file associated with the media file, searching the media file for media components and adding metadata entries that are associated with the media components to the metadata file.

Additional exemplary embodiments include a metadata generation system, including a general purpose computer configured to receive a media file and generate a metadata file associated with the media file, a metadata generation application residing on the general purpose compute and having instructions to receive the media file, search the media file for useful descriptive information associated with the media file, categorize and/or organize this information in the form of metadata, add the metadata to the metadata file associated with the media file, search the media file for media components and add metadata entries that are associated with the media components to the metadata file.

Further exemplary embodiments include a computer program product for generating a metadata file associated with a media file, the computer program product including, instructions for causing a computer to implement a method, including receiving a media file, searching the media file for useful descriptive information associated with the media file, categorizing and/or organizing this information in the form of metadata, adding the metadata to a metadata file associated with the media file, searching the media file for media components, and adding metadata entries that are associated with the media components to the metadata file.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Exemplary embodiments include systems and methods for building up a body of metadata related to a media file (e.g., text, image, audio and video). In exemplary embodiments, the metadata is derived from the content of the file. In exemplary embodiments, a metadata file associated with the media file includes metadata that is provided with the associated file medium. For example, a user can indicate that a video file is a birthday video from a particular date. Such key words from the user's description can form the beginning of the metadata file, and may also be used to establish a context for pattern-matching, searching, and associating keywords. The systems and methods described herein then extract metadata from the media file following a proscribed format as described further herein. In addition, as metadata is derived from the file, the system and methods described herein can build databases of metadata from which future metadata files can be built based on the databases. The exemplary metadata files described herein can be implemented for cataloging and searching media, among other uses.

Figure 1:
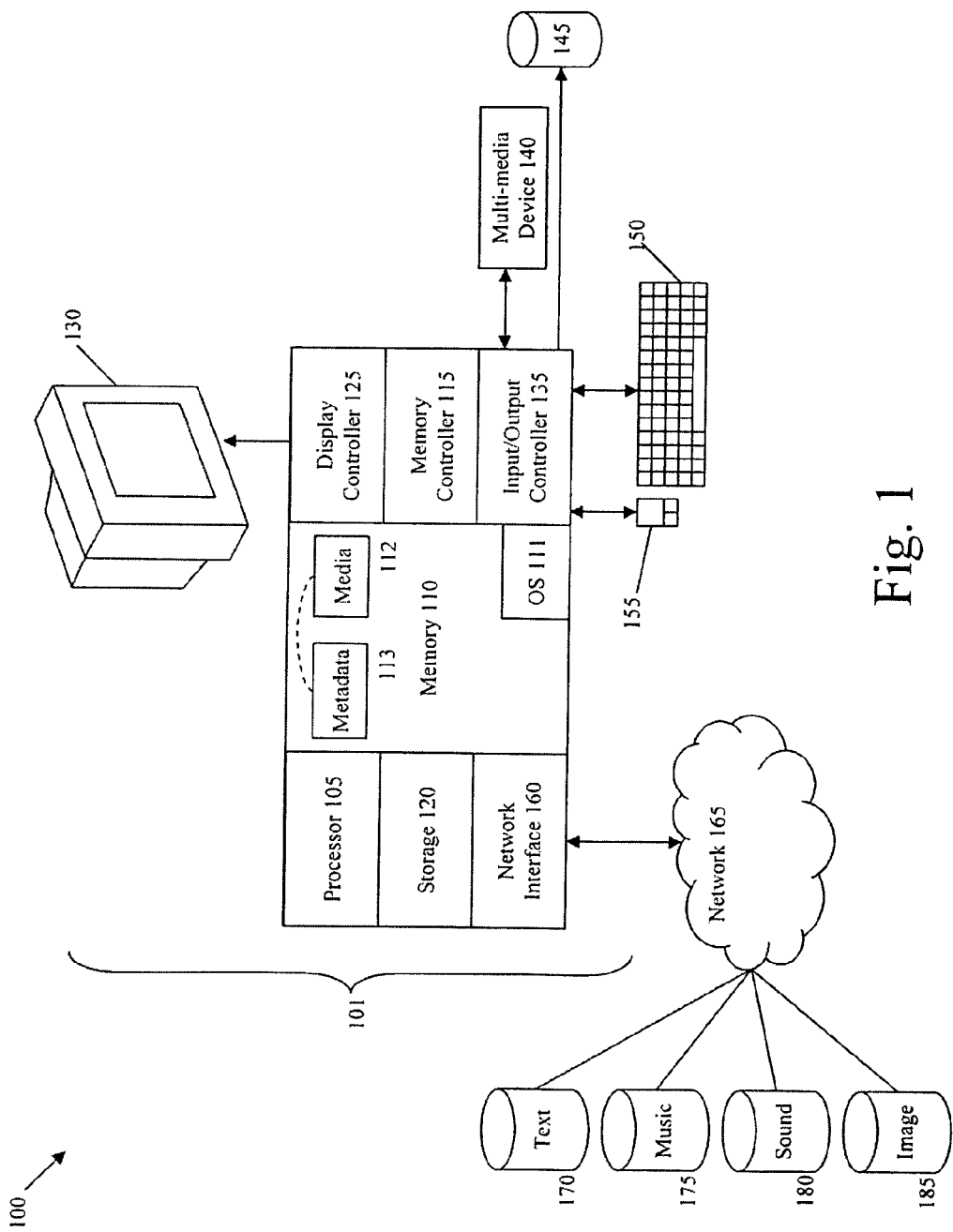
FIG. 1 illustrates a block diagram of an exemplary content-generated metadata system.

FIG. 1 illustrates an exemplary embodiment of a system 100 for generating metadata from content. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes a general-purpose computer 101 into which a user can receive media files for storage, processing, viewing and other manipulation.

In exemplary embodiments, in terms of hardware architecture, the computer 101 includes a processor 101, memory 110 coupled to a memory controller 115, and one or more input and/or output (I/O) devices 140, 145 (or peripherals) that are communicatively coupled via a local input/output controller 135. The I/O devices can include an external device such as a digital camera, scanner or other device that provides a media file 112 from which a metadata file 113 can be generated as described herein. The input/output controller 135 can be, for example but not limited to, based on one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among, several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the metadata generation/derivation methods described herein in accordance with exemplary embodiments and a suitable operating system (OS) 111. The operating system 111 essentially controls the execution of other computer programs, such the metadata generation/derivation systems and methods described herein, and provides scheduling, input-output control, file and data management, memory management, and communication control and related services.

The metadata generation/derivation methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the metadata generation/derivation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like, a video camera or player/recorder, a CD or DVD player/recorder, or a USB-based "flash"-based removable memory device. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between die computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 110, and support the transfer of data among the hardware devices. The BIOS is stored in ROM so that the BIOS can be executed when the computer 101 is activated.

When the computer 101 is in operation: the processor 105 is configured to execute software stored within the memory 110, to communicate data to and from the memory 11, and to generally control operations of the computer 101 pursuant to the software. The metadata generation/derivation methods described herein and the OS 11, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The metadata generation/ derivation methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the metadata generation/derivation methods are implemented in hardware, the metadata generation/derivation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, one or more processes in the memory 110 can monitor activity from the keyboard 150 and the mouse 155 or a combination thereof. The processes can further monitor long-running jobs that have been initiated on the computer 101. The processes can further monitor which and how many other machines can control the computer 101 either locally or remotely. In further exemplary embodiments, the processes can accept traffic only from a common network maintenance control system that provides limited services.

The system 100 can further include one or more external databases such as a text (keywords) database 170, a music database 175, a sound database 180 and an image database 185, from which the systems and methods described herein can extract comparisons and data when generating the metadata file 113, and to which derived metadata may be written when it has been generated. These databases may include associations between metadata and metadata types; such associations may be organized into ontologies which describe the relationships between the metadata. These associations may be restricted to a specific content owner (providing, for example, a specialized, possibly proprietary, ontology for a large company), or they may be shared in a general way across multiple content owners, providing, for example, a base of information to improve the creation and derivation of metadata for common events such as vacations, parties, graduations, and the like. Finally, these associations may be reigned by user input. For example, when a user searches for a specific term, image, or sound, the user can indicate which of the results are pertinent and which are not, thus providing valuable input to the derived metadata association process.

Figure 2:
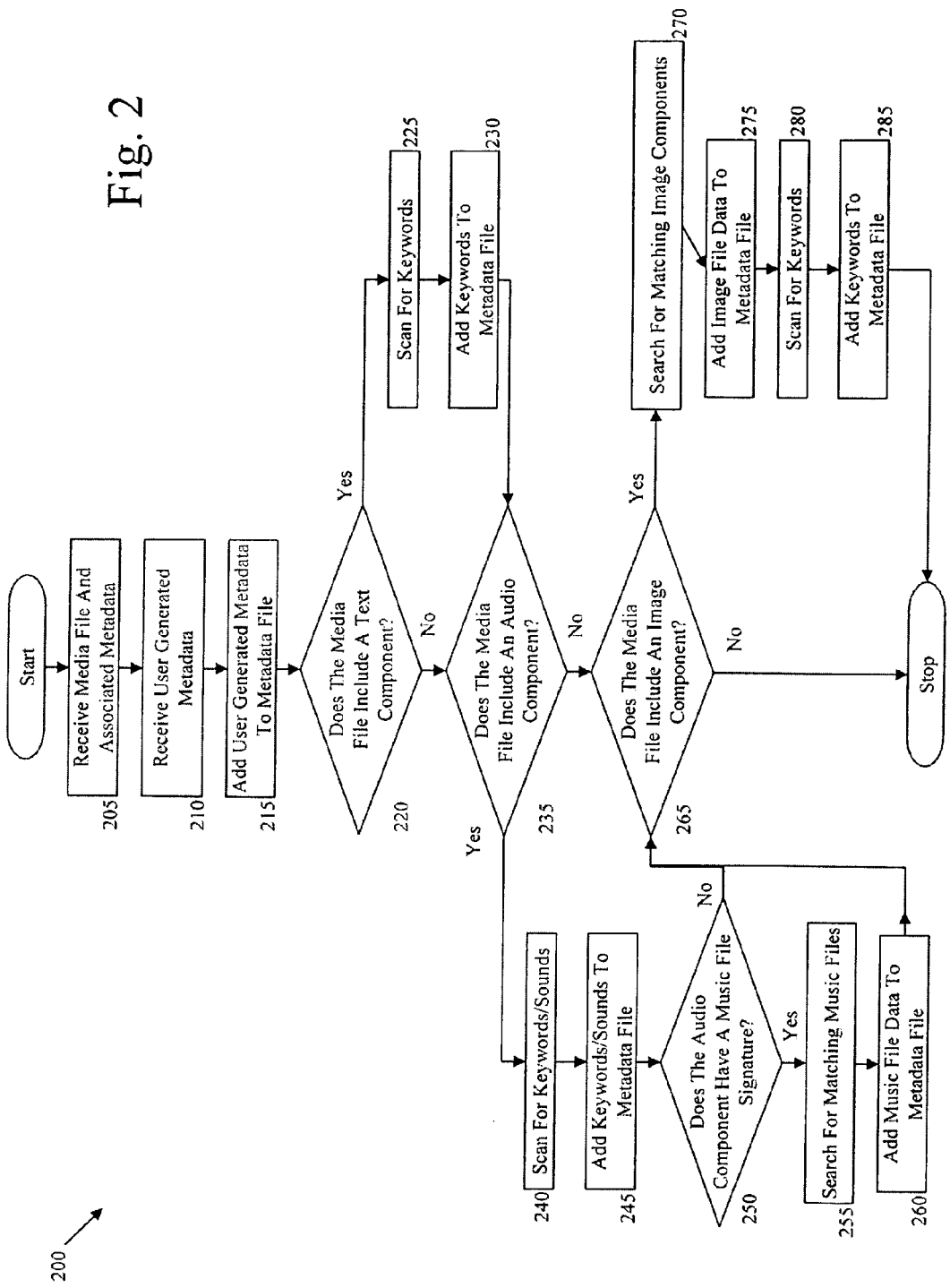
FIG. 2 illustrates a flowchart of a content-generated metadata method in accordance with exemplary embodiments.

FIG. 2 illustrates a flowchart content-generated metadata method 200 in accordance with exemplary embodiments. At block 205, the media file 112 can be received in the general purpose computer 101 from the multi-media device 140, or from another data source located across a network. As described above, the media file 112 can be downloaded to the general-purpose computer 101 for storage, processing, viewing and other manipulation. In addition, in accordance with exemplary embodiments, the metadata file 113 can automatically be generated for storage in the memory 110 and associated with the media file 112. It is appreciated that media files such as the media file 112 may already contain certain metadata associated with the medium. For example, a video file may include a date that is automatically generated by the video camera and stored in the video file. This metadata is extracted and added to the metadata file 113. At block 210, the system can receive user-generated data related to the media file 112, which can be any description that is meaningful to the user, such as a description and place of the associated event captured in the media file 112. At block 215, the user-generated metadata can be added to the metadata file 113. At block 220, the method 200 can determine if the media file 112 includes a text component. If the media file 112 does include a text component at block 220, then at block 225, the method 200 can scan for keywords from the media file 112. Such keywords can include proper names (for example, persons, places) and calendar- or time-related information such as month, day, year, hour, minute. It is appreciated that there are a variety of algorithms that can determine whether or not a word is a useful keyword for the generation of metadata. In exemplary embodiments, the general-purpose computer 101 can access the keywords database 170 from the network 135. In exemplary embodiments, a database of useful keywords can be actively generated and stored in the memory 110, or other storage device. This keyword database can be accessed when the general-purpose computer 101 receives a new media file 112 for metadata generation. Regardless of how the keywords are determined, at block 230, the keywords can be added to the metadata file 113. The method 200 then processes block 235, described further herein.

Following the processing of block 220/230, at block 235, the method 200 determines whether there is an audio component in the media file 112. If the media file 112 does include an audio component at block 235, then at block 240, the method 200 can scan for keywords from the media file 112. As described herein, the keywords can include names and dates. Following the normal rules of index creation, conjunctions, articles, and other common words are generally not included. Words which are less common in general writing, but which occur frequently in the subject medium, are particularly useful for metadata-based searches. It is appreciated that there are a variety of algorithms that can determine whether or not a word is a useful keyword for the generation of metadata. In exemplary embodiments, the central processing device 105 can access the keywords database 170 from the network 165. In exemplary embodiments, a database of useful keywords and their associations can be actively generated and stored in the memory 110. This keyword database 170 can be accessed when the central processing device receives a new media file 112 for metadata generation. Regardless of how the keywords are determined, at block 245, the keywords can be added to the metadata file 113. In exemplary embodiments, the method 200 can also recognize whether there are any significant key sounds in the media file 112. For example, there may be a sound whose characteristics (frequency, wave shape) are similar to the characteristics of a train horn included in the media file 112. The method 200 can therefore access a database such as the sound database 180 via the network 165. Any key sounds found in the media file 112 using common audio pattern matching techniques can also be stored as metadata in the metadata file 113 at block 245.

At block 250, the method 200 further determines if the audio component found in the media file 112 includes a signature consistent with a music file. It is appreciated that music files such as MP3 files have a signature that can be detected. Alternatively, background music found, for example, in the audio track of a video recording, may be detected and identified using audio pattern matching. This signature alerts the method 200 that the media file 112 either includes a music component or is entirely a music file. If the method 200 does determine that there is a music file signature at block 250, then at block 255, the method 200 can search for matching music files. It is appreciated that the method can search locally, such as in the memory 110. Alternatively, the method 200 can search via the network 165 on a database such as the music database 175. Once the method 200 has identified the music file to which the audio component matches, at block 260, the method can store the music file data in the metadata file 113. The method 200 then processes block 265, described further herein.

Following the processing of block 250/260, at block 265, the method 200 determines whether the media file 112 includes an image component. If there is an image component at block 265, then at block 270, the method 200 searches for matching image files. Typical digital image files include images encoded using JPEG, TIFF, PNG and the like, as well as images stored in "raw" digital forms, often referred to as bit-mapped images. It is appreciated that the method can search locally for matching images such as in the memory 110. Alternatively, the method 200 can search image databases on the network 165 such as the image database 185. For example, using optical pattern matching tools such as edge detection and shape construction, rotation, scaling, and perspective distortion, the method may determine that there is a skyline in the media file 112. As such, the method can search for skylines in the image database 185 to search for a match. Those skilled in the art further appreciate that there are a variety of pattern recognition and facial recognition methods that can be implemented in order to ascertain matches in the media file 112.

In exemplary embodiments, once matches are determined, then the image file data can be added to the metadata file 112 at block 275. Furthermore, at block 280 the method can scan the image component of the media file 112 to determine if there are any keywords in the image. For example, optical image processing may identify recognizable words, letters, numbers, street signs, business names, billboards, clock faces, calendars, t-shirt logos or other text displays in the image. The keywords extracted from the image component can further be stored in the metadata file 112 at block 285. It is appreciated that the image components described herein can be either still images (e.g., digital photographs) or motion images (e.g., digital video). As such, either still images or video images can be scanned for similar textual content. In exemplary embodiments, each item added to the metadata file 113 includes its own descriptive data, including at least one of the source of the data (audio, video, image), the method used to obtain the data, a confidence value of the accuracy of the data. This information can be added using techniques such as XML. In exemplary embodiments, the system processing the content, such as the general-purpose computer 101, can build up its own database of words, images, music, etc., and their associations, which can recursively improve the confidence of generated metadata.

In exemplary embodiments, the above-described method 200 create the metadata file 112 associated with the given media file 120. Furthermore, in exemplary embodiments, the metadata file 113 is searchable based on the metadata. For example, at a time after creation of the metadata file 112, is the user wants to search for the media file 112, the user can enter a series of search terms, for example, via an interface on the display 130, related to the user's knowledge or memory of the media file 112. In addition, the user can enter a series of search terms with the goal of finding all media related to a particular time, place, person event or other category. Other methods of search input may also be used, such as the presentation of an image using a camera or scanner, or of a sound, melody, or noise using a microphone or CD player.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A metadata generation method on a computer, comprising:

receiving a media file;

searching the media file for metadata associated with the media file;

adding the metadata to a metadata file associated with the media file;

searching by the computer the media file for media components;

adding metadata entries that are associated with the media components to the metadata file;

wherein the metadata entries have metadata types;

organizing by the computer, associations between the metadata types of the metadata entries such that the associations are organized into ontologies that describe relationships between the metadata entries;

in response to restricting by a specific content owner, restricting the associations between the metadata types of the metadata entries by the specific content owner having a particular ontology;

forming the associations between the metadata types of the metadata entries across multiple content owners for a derivation and a creation of the metadata for a common event including a vacation event and a graduation event, in response to not restricting by the specific content owner;

providing by the computer a confidence level for an accuracy of the metadata entries and recursively improving the confidence level by utilizing the associations;

receiving user-generated metadata;

adding the user-generated metadata to the metadata file;

wherein searching the media file for the media components comprises searching the media file for audio components to detect a music file signature;

responsive to the computer detecting the music file signature of the media file, searching by the computer locally in memory of the computer for a matching music file stored in the memory in which the matching music file matches the music file signature;

responsive to the computer identifying the matching music file locally stored in the memory of the computer, storing data of the matching music file into the metadata file;

wherein searching the media file for the media components comprises searching by the computer for text components by scanning the media file for proper names of persons and places and by scanning the media file for time-related information of months, days, years, hours, and minutes; and when the metadata is actively generated and stored in a database of useful keywords, accessing by the computer the database of the useful keywords for metadata generation based on the computer receiving a new media file.

2. The method as claimed in claim 1 wherein searching the media file for the media components comprises searching the media file for keywords; and wherein searching the media file for the keywords comprises identifying recognizable text on calendars, clock faces, and clothing.

3. The method as claimed in claim 1, wherein searching the media file for the audio components comprises searching the media file for sounds and keywords.

4. The method as claimed in claim 1 wherein searching the media file for the media components comprises searching the media file for image components.

5. The method as claimed in claim 4 wherein searching the media file for the image components comprises searching the media file for sounds and keywords.

6. A metadata generation system, comprising:

a general purpose computer configured to receive a media file and generate a metadata file associated with the media file;

a metadata generation application residing on the general purpose computer and having instructions to:

receive the media file;

search the media file for metadata associated with the media file;

add the metadata to the metadata file associated with the media file;

search the media file for media components;

add metadata entries that are associated with the media components to the metadata file;

wherein the metadata entries have metadata types;

organize associations between the metadata types of the metadata entries such that the associations are organized into ontologies that describe relationships between the metadata entries;

in response to restricting by a specific content owner, restrict the associations between the metadata types of the metadata entries by the specific content owner having a particular ontology;

form the associations between the metadata types of the metadata entries across multiple content owners for a derivation and a creation of the metadata for a common event including a vacation event and a graduation event, in response to not restricting by the specific content owner;

provide a confidence level for an accuracy of the metadata entries and recursively improving the confidence level by utilizing the associations;

receiving user-generated metadata;

adding the user-generated metadata to the metadata file;

wherein searching the media file for the media components comprises searching the media file for audio components to detect a music file signature;

responsive to the general purpose computer detecting the music file signature of the media file, search locally in memory of the general purpose computer for a matching music file stored in the memory in which the matching music file matches the music file signature;

responsive to identifying the matching music file locally stored in the memory of the general purpose computer, store data of the matching music file into the metadata file;

wherein searching the media file for the media components comprises searching by the general purpose computer for text components by scanning the media file for proper names of persons and places and by scanning the media file for time-related information of months, days, years, hours, and minutes; and when the metadata is actively generated and stored in a database of useful keywords, access by the general purpose computer the database of the useful keywords for metadata generation based on the computer receiving a new media file.

7. The system as claimed in claim 6 wherein searching the media file for the media components comprises searching the media file for keywords.

8. The system as claimed in claim 6 wherein searching the media file for the media components comprises searching the media file for image components.

9. A computer program product stored on a non-transitory computer readable medium for generating a metadata file associated with a media file, the computer program product including instructions when executed causes a computer having a processor, to implement a method, comprising:

receiving a media file;

searching the media file for metadata associated with the media file;

adding the metadata to a metadata file associated with the media file;

searching the media file for media components;

adding metadata entries that are associated with the media components to the metadata file;

wherein the metadata entries have metadata types;

organizing associations between the metadata types of the metadata entries such that the associations are organized into ontologies that describe relationships between the metadata entries;

in response to restricting by a specific content owner, restricting the associations between the metadata types of the metadata entries by the specific content owner having a particular ontology;

forming the associations between the metadata types of the metadata entries across multiple content owners for a derivation and a creation of the metadata for a common event including a vacation event and a graduation event, in response to not restricting by the specific content owner;

providing a confidence level for an accuracy of the metadata entries and recursively improving the confidence level by utilizing the associations;

receiving user-generated metadata;

adding the user-generated metadata to the metadata file;

wherein searching the media file for the media components comprises searching the media file for audio components to detect a music file signature;

responsive to the computer detecting the music file signature of the media file, searching by the computer locally in memory of the computer for a matching music file stored in the memory in which the matching music file matches the music file signature;

responsive to the computer identifying the matching music file locally stored in the memory of the computer, storing data of the matching music file into the metadata file;

wherein searching the media file for the media components comprises searching by the computer for text components by scanning the media file for proper names of persons and places and by scanning the media file for time-related information of months, days, years, hours, and minutes; and when the metadata is actively generated and stored in a database of useful keywords, accessing by the computer the database of the useful keywords for metadata generation based on the computer receiving a new media file.

10. The computer program product as claimed in claim 9 wherein searching the media file for the media components comprises searching the media file for keywords.

11. The computer program product as claimed in claim 9 wherein searching the media file for the audio components comprises searching the media file for sounds, and keywords.

12. The computer program product as claimed in claim 9 wherein searching the media file for the media components comprises searching the media file for image components.

13. The computer program product as claimed in claim 12 wherein searching the media file for the image components comprises searching the media file for sounds and keywords.

* * * * *